(12) United States Patent
Milligan et al.

(10) Patent No.: US 8,426,498 B2
(45) Date of Patent: *Apr. 23, 2013

(54) DRAG REDUCTION OF ASPHALTENIC CRUDE OILS

(75) Inventors: Stuart N. Milligan, Ponca City, OK (US); Ray L. Johnston, Ponca City, OK (US); Timothy L. Burden, Ponca City, OK (US); Wayne R. Dreher, College Station, TX (US); Kenneth W. Smith, Tonkawa, OK (US); William F. Harris, Palm Harbor, FL (US)

(73) Assignee: Phillips 66 Company, Houston, TX (US)

(*) Notice: Subject to any disclaimer, the term of this patent is extended or adjusted under 35 U.S.C. 154(b) by 26 days.

This patent is subject to a terminal disclaimer.

(21) Appl. No.: 13/208,139

(22) Filed: Aug. 11, 2011

(65) Prior Publication Data

US 2012/0305091 A1     Dec. 6, 2012

Related U.S. Application Data

(63) Continuation of application No. 11/615,539, filed on Dec. 22, 2006, now Pat. No. 8,022,118.

(51) Int. Cl.
*C09K 8/588* (2006.01)
*B05D 5/08* (2006.01)

(52) U.S. Cl.
USPC ............. 523/175; 523/149; 208/22; 208/23; 208/39; 208/44; 208/298; 406/46; 406/47; 406/48; 507/103; 507/117; 507/118; 507/119; 507/120; 507/121; 507/203; 507/219; 507/221; 507/224; 507/225; 507/226; 507/935; 524/59; 524/62; 524/64; 524/67; 524/543; 524/556

(58) Field of Classification Search ............. 523/175, 523/149; 208/22, 23, 39, 44, 298; 406/46, 406/47, 48; 507/103, 117, 118, 119, 120, 507/121, 203, 219, 221, 224, 225, 226, 935; 524/59, 62, 64, 67, 543, 556

See application file for complete search history.

(56) References Cited

U.S. PATENT DOCUMENTS

| | | | | |
|---|---|---|---|---|
| 3,865,124 | A * | 2/1975 | Kohler et al. | 585/10 |
| 4,527,581 | A * | 7/1985 | Motier | 137/13 |
| 4,736,005 | A * | 4/1988 | Castner | 526/229 |
| 5,021,526 | A * | 6/1991 | Ball | 526/240 |

FOREIGN PATENT DOCUMENTS

EP  0882739  * 12/1998

* cited by examiner

*Primary Examiner* — Robert C Boyle
(74) *Attorney, Agent, or Firm* — Phillips 66 Company

(57) ABSTRACT

A method of introducing a drag reducing polymer into a pipeline such that the friction loss associated with the turbulent flow though the pipeline is reduced by suppressing the growth of turbulent eddies. The drag reducing polymer is introduced into a liquid hydrocarbon having an asphaltene content of at least 3 weight percent and/or an API gravity of less than about 26° to thereby produce a treated liquid hydrocarbon. The treated liquid hydrocarbon does not have a viscosity less than the viscosity of the liquid hydrocarbon prior to treatment with the drag reducing polymer. Additionally, the drag reducing polymer is added to the liquid hydrocarbon in the range from about 0.1 to about 500 ppmw.

5 Claims, 3 Drawing Sheets

DRAG REDUCTION OF ASPHALTENIC CRUDE OILS

CROSS-REFERENCE TO RELATED APPLICATIONS

Figure 1:
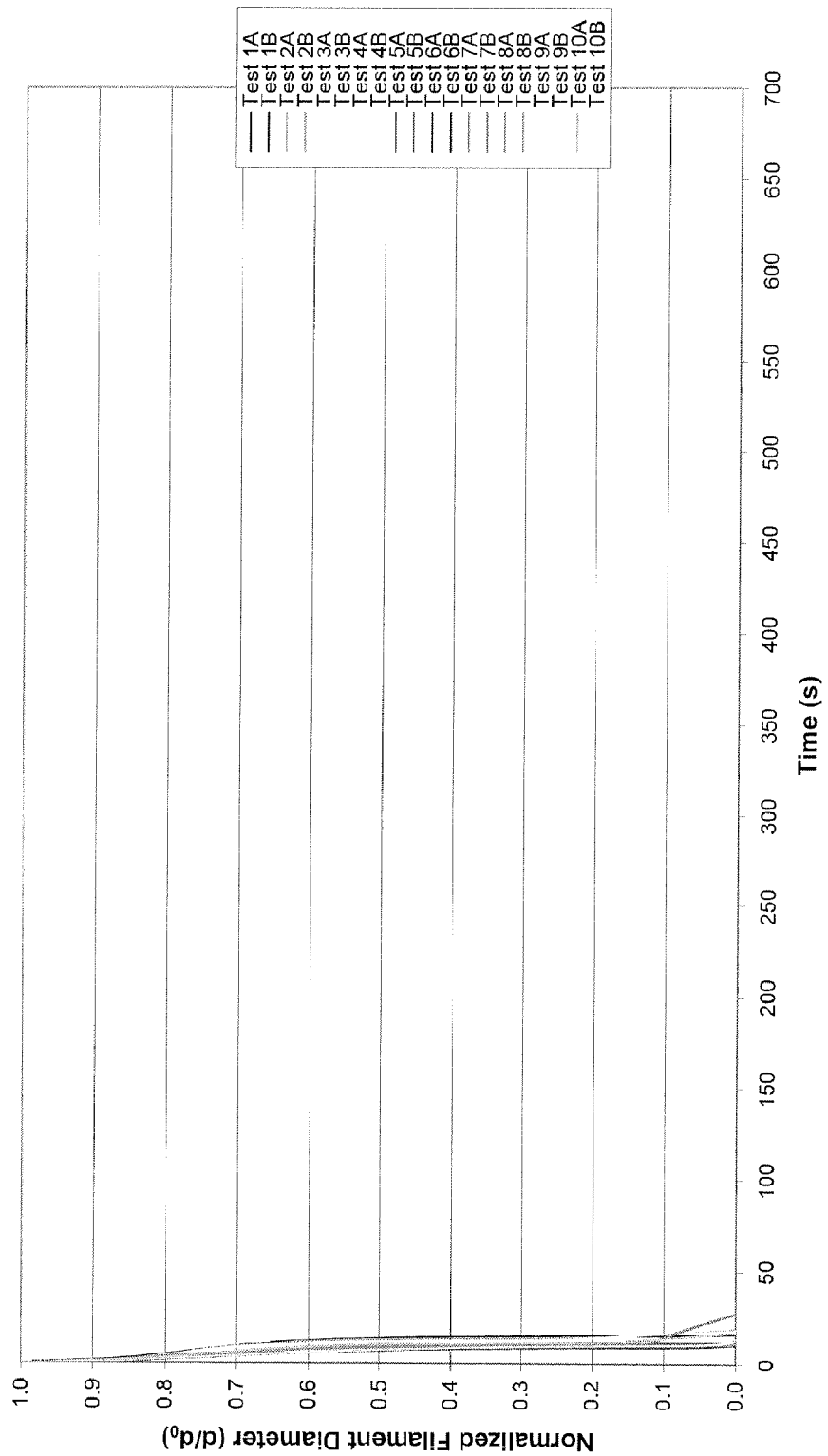

This application is a continuation application which claims the benefit of and priority to U.S. application Ser. No. 11/615,539 filed Dec. 22, 2006, entitled "Drag Reduction of Asphaltenic Crude Oils," which is hereby incorporated by reference in its entirety.

FIELD OF THE INVENTION

The present invention relates generally to high molecular weight drag reducers for use in crude oils.

BACKGROUND

When fluids are transported by a pipeline, there is typically a drop in fluid pressure due to friction between the wall of the pipeline and the fluid. Due to this pressure drop, for a given pipeline, fluid must be transported with sufficient pressure to achieve the desired throughput. When higher flow rates are desired through the pipeline, more pressure must be applied due to the fact that, as flow rates are increased, the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of a fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag reducing polymers typically have molecular weights in excess of five million.

Conventional polymeric drag reducers, however, typically do not perform well in crude oils having a low API gravity and/or a high asphaltene content. Accordingly, there is a need for improved drag reducing agents capable of reducing the pressure drop associated with the turbulent flow of low API gravity and/or high-asphaltene crude oils through pipelines.

SUMMARY OF THE INVENTION

A method of introducing a drag reducing polymer into a pipeline such that the friction loss associated with the turbulent flow though the pipeline is reduced by suppressing the growth of turbulent eddies. The drag reducing polymer is introduced into a liquid hydrocarbon having an asphaltene content of at least 3 weight percent and/or an API gravity of less than about 26° to thereby produce a treated liquid hydrocarbon. The treated liquid hydrocarbon does not have a viscosity less than the viscosity of the liquid hydrocarbon prior to treatment with the drag reducing polymer. Additionally, the drag reducing polymer is added to the liquid hydrocarbon in the range from about 0.1 to about 500 ppmw.

A method of introducing a drag reducing polymer having a solubility parameter of at least about 17 $MPa^{1/2}$, into a pipeline, such that the friction loss associated with the turbulent flow through the pipeline is reduced by suppressing the growth of turbulent eddies. The drag reducing polymer is introduced into a liquid hydrocarbon having an asphaltene content of at least 3 weight percent and/or an API gravity of less than about 26° to thereby produce a treated liquid hydrocarbon. The treated liquid hydrocarbon would have a viscosity less than the viscosity of the liquid hydrocarbon prior to treatment with the drag reducing polymer. The drag reducing polymer would comprise at least about 25,000 repeating units, and wherein a plurality of the repeating units comprise a heteroatom, wherein the heteroatom is selected from the group consisting of an oxygen atom, a nitrogen atom, a sulfur atom and/or a phosphorus atom and wherein the drag reducing polymer has a weight average molecular weight of at least $1 \times 10^6$ g/mol. Additionally, the drag reducing polymer is added to the liquid hydrocarbon in the range from about 0.1 to about 500 ppmw.

BRIEF DESCRIPTION OF THE DRAWING FIGURES

Figure 2:
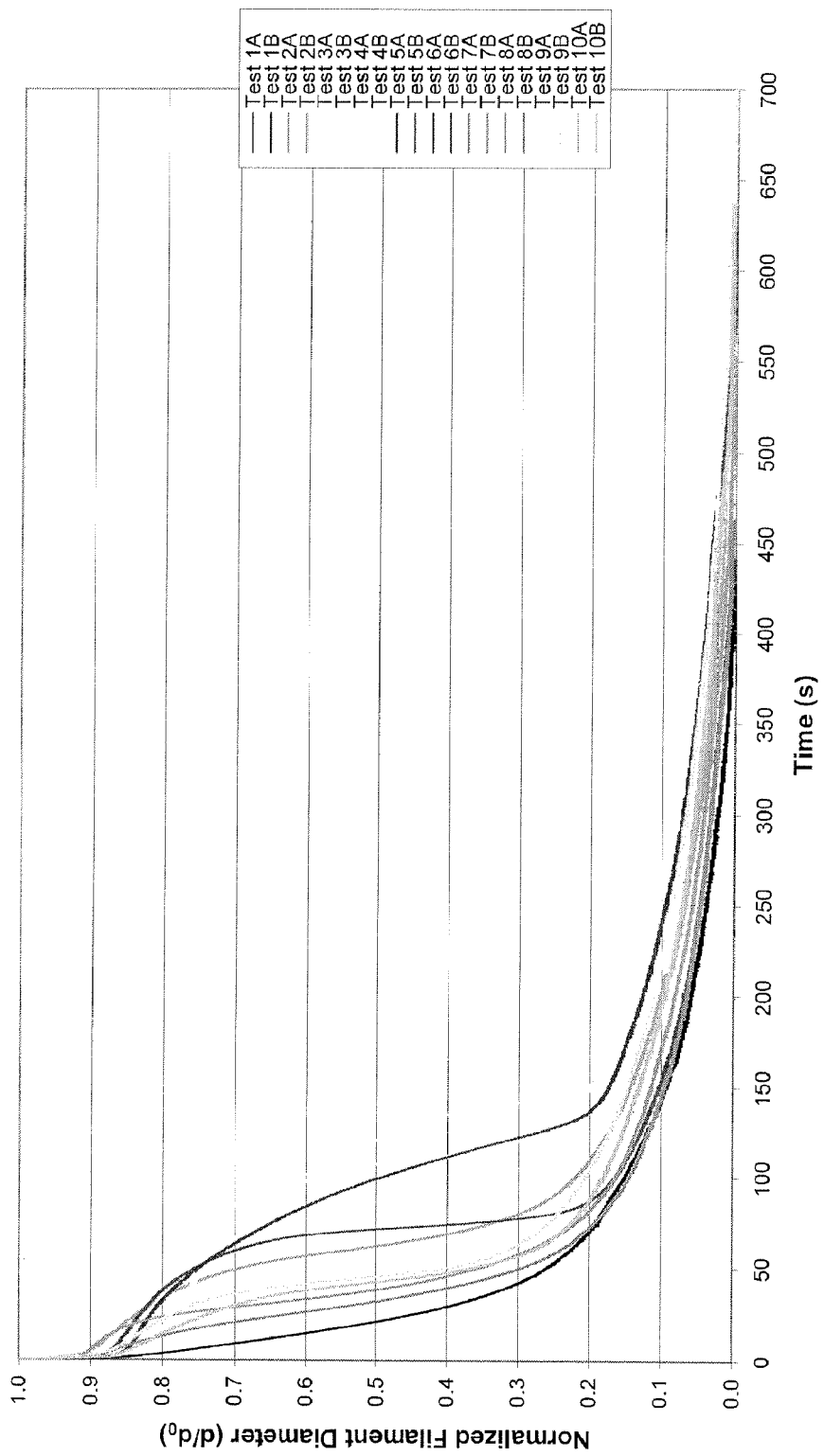
Figure 3:
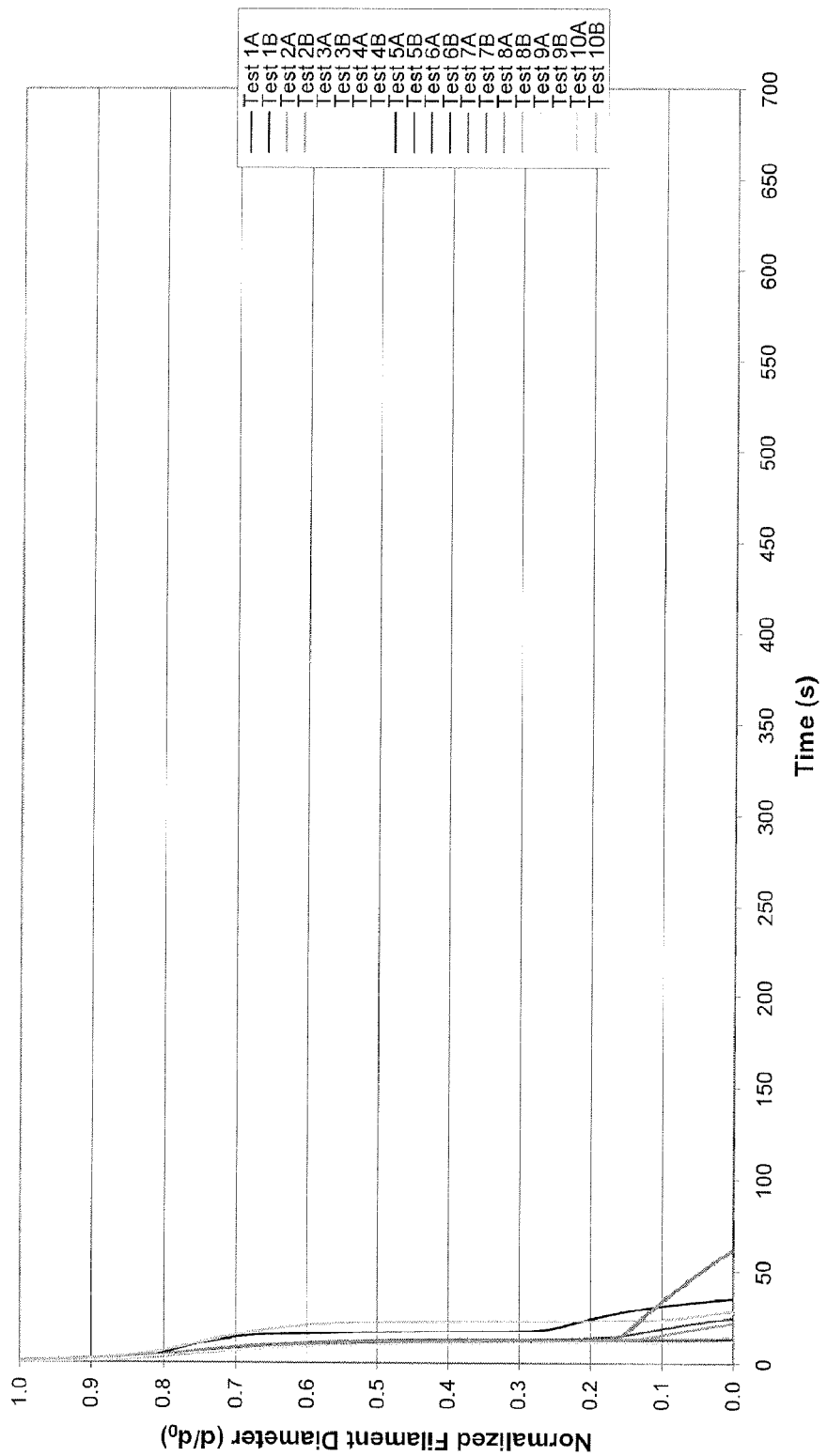

A preferred embodiment of the present invention is described in detail below with reference to the attached drawing figures, wherein:

FIG. 1 is a normalized filament diameter vs. time plot depicting the normalized capillary breakup time for untreated San Joaquin Valley Heavy Crude Oil determined in accordance with the procedure described in Example 4;

FIG. 2 is a normalized filament diameter vs. time plot depicting the normalized capillary breakup time for San Joaquin Valley Heavy Crude Oil having 500 parts per million by weight (ppmw) of poly(2-ethylhexyl methacrylate) dissolved therein determined in accordance with the procedure described in Example 4; and FIG. 3 is a normalized filament diameter vs. time plot depicting the normalized capillary breakup time for San Joaquin Valley Heavy Crude Oil having 500 ppmw of a poly(1-decene) dissolved therein determined in accordance with the procedure described in Example 4.

DETAILED DESCRIPTION

In accordance with one embodiment of the present invention, the pressure drop associated with flowing a liquid hydrocarbon through a conduit, such as a pipeline, can be reduced by treating the liquid hydrocarbon with a drag reducing polymer having at least one heteroatom. In one embodiment, the liquid hydrocarbon can be a heavy crude oil.

In one embodiment of the present invention, the liquid hydrocarbon can comprise asphaltene compounds. As used herein, "asphaltenes" are defined as the fraction separated from crude oil or petroleum products upon addition of pentane, as described below in Example 3. While difficult to characterize, asphaltenes are generally thought to be high molecular weight, non-crystalline, polar compounds which exist in crude oil. In one embodiment of the present invention, the liquid hydrocarbon can comprise asphaltene compounds in an amount of at least about 3 weight percent, in the range of from about 4 to about 35 weight percent, or in the range of from 5 to 25 weight percent.

In another embodiment of the present invention, the liquid hydrocarbon can comprise heteroatoms. As used herein, the term "heteroatom" is defined as any atom that is not a carbon or hydrogen atom. Typically, heteroatoms include, but are not limited to, sulfur, nitrogen, oxygen, phosphorus, and chlorine atoms. In one embodiment, the liquid hydrocarbon can comprise sulfur in an amount of at least about 1 weight percent, in the range of from about 1 to about 10 weight percent, in the range of from about 1.2 to about 9 weight percent, or in the range of from 1.5 to 8 weight percent. Additionally, the liquid hydrocarbon can comprise nitrogen in an amount of at least about 1,300 parts per million by weight (ppmw), at least about 1,400 ppmw, or at least 1,500 ppmw.

In another embodiment of the present invention, the liquid hydrocarbon can comprise one or more metal components. In one embodiment, the liquid hydrocarbon can comprise metals in an amount of at least about 1 ppmw, in the range of from about 1 to about 2,000 ppmw, in the range of from about 50 to about 1,500 ppmw, or in the range of from 100 to 1,000 ppmw. Typical metals include, but are not limited to, nickel, vanadium, and iron. In one embodiment, the liquid hydrocarbon can comprise nickel in an amount of at least about 1 ppmw, in the range of from about 5 to about 500 ppmw, or in the range of from 10 to 250 ppmw. Additionally, the liquid hydrocarbon can comprise vanadium in an amount of at least about 1 ppmw, in the range of from about 5 to about 500 ppmw, or in the range of from 10 to 250 ppmw. Further, the liquid hydrocarbon can comprise iron in an amount of at least about 1 ppmw, in the range of from about 2 to about 250 ppmw, or in the range of from 5 to 100 ppmw.

In another embodiment of the present invention, the liquid hydrocarbon can comprise a residuum. As used herein, the term "residuum" is defined as the residual material remaining in the bottom of a fractionating tower after the distillation of crude oil as determined by ASTM test method D2892-05. In one embodiment, the liquid hydrocarbon can comprise at least about 10 weight percent, at least about 15 weight percent, or in the range of from 20 to 60 weight percent of a residuum having an initial boiling point of at least about 1,050° F.

In another embodiment, the liquid hydrocarbon can comprise conradson carbon. As used herein, the term "conradson carbon" is defined as the measured amount of carbon residue left after evaporation and pyrolysis of crude oil as determined by ASTM test method D189-05. In one embodiment, the liquid hydrocarbon can comprise conradson carbon in an amount of at least about 1 weight percent, in the range of from about 2 to about 50 weight percent, in the range of from about 3.5 to 45 weight percent, or in the range of from 5 to 40 weight percent.

In another embodiment of the present invention, the liquid hydrocarbon can have a low to intermediate API gravity. As used herein, the term "API gravity" is defined as the specific gravity scale developed by the American Petroleum Institute for measuring the relative density of various petroleum liquids. API gravity of a liquid hydrocarbon is determined according to the following formula:

API gravity=(141.5/SG at 60° F.)−131.5 where SG is the specific gravity of the liquid hydrocarbon at 60° F. Additionally, API gravity can be determined according to ASTM test method D1298. In one embodiment, the liquid hydrocarbon can have an API gravity of less than about 26°, in the range of from about 5° to about 25°, or in the range of from 5° to 23°.

In another embodiment of the present invention, the liquid hydrocarbon can be a component of a fluid mixture that further comprises a non-hydrocarbon fluid and/or a non-liquid phase. In one embodiment, the non-hydrocarbon fluid can comprise water, and the non-liquid phase can comprise natural gas. Additionally, when the liquid hydrocarbon is a component of a fluid mixture, the liquid hydrocarbon can account for at least about 50 weight percent, at least about 60 weight percent, or at least 70 weight percent of the fluid mixture.

In another embodiment of the present invention, the liquid hydrocarbon can have a solubility parameter sufficient to allow at least partial dissolution of the above mentioned drag reducing polymer in the liquid hydrocarbon. The solubility parameter ($\delta_2$) of the liquid hydrocarbon can be determined according to the following equation:

$$\delta_2 = [(\Delta H_v - RT)/V]^{1/2}$$

where $\Delta H_v$ is the energy of vaporization, R is the universal gas constant, T is the temperature in Kelvin, and V is the molar volume. $\delta_2$ is given in units of $MPa^{1/2}$. The solubility parameter for the liquid hydrocarbon is determined in accord with the above equation and the description found on pages 465-467 of Strausz, O. & Lown, M., *The Chemistry of Alberta Oil Sands, Bitumens and Heavy Oils* (Alberta Energy Research Institute, 2003). In one embodiment, the liquid hydrocarbon can have a solubility parameter of at least about 17 $MPa^{1/2}$, or in the range of from about 17.1 to about 24 $MPa^{1/2}$, or in the range of from 17.5 to 23 $MPa^{1/2}$.

As mentioned above, the liquid hydrocarbon can be a heavy crude oil. Suitable examples of heavy crude oils include, but are not limited to, Merey heavy crude, Petrozuata heavy crude, Corocoro heavy crude, Albian heavy crude, Bow River heavy crude, Maya heavy crude, and San Joaquin Valley heavy crude. Additionally, the liquid hydrocarbon can be a blend of heavy crude oil with lighter hydrocarbons or diluents. Suitable examples of blended crude oils include, but are not limited to, Western Canadian Select and Marlim Blend.

As mentioned above, the liquid hydrocarbon can be treated with a drag reducing polymer. In one embodiment of the present invention, the drag reducing polymer can be in the form of a latex drag reducer comprising a high molecular weight polymer dispersed in an aqueous continuous phase. The latex drag reducer can be prepared via emulsion polymerization of a reaction mixture comprising one or more monomers, a continuous phase, at least one surfactant, and an initiation system. The continuous phase generally comprises at least one component selected from the group consisting of water, polar organic liquids, and mixtures thereof. When water is the selected constituent of the continuous phase, the reaction mixture can also comprise a buffer. Additionally, as described in more detail below, the continuous phase can optionally comprise a hydrate inhibitor. In another embodiment, the drag reducing polymer can be in the form of a suspension or solution according to any method known in the art.

In one embodiment of the present invention, the drag reducing polymer can comprise a plurality of repeating units of the residues of one or more of the monomers selected from the group consisting of:

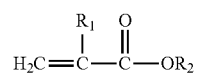

(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—R$_4$ or —(CH2CH(CH3)O)$_x$—R$_4$ radical wherein x is in the range of from 1 to 50 and R$_4$ is H, a C1-C30 alkyl radical, or a C6-C30 alkylaryl radical;

R$_3$-arene-R$_4$ (B)

wherein arene is a phenyl, naphthyl, anthracenyl, or phenanthrenyl, R$_3$ is CH=CH$_2$ or CH$_3$—C=CH$_2$, and R$_4$ is H, a C1-C30 alkyl radical, a C5-C30 substituted or unsubstituted cycloalkyl radical, C1, SO$_3$, OR$_B$, or COOR$_C$, wherein R$_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein R$_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

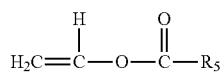 (C)

wherein R$_5$ is H, a C1-C30 alkyl radical, or a C6-C20 substituted or unsubstituted aryl radical;

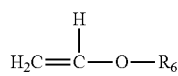 (D)

wherein R$_6$ is H, a C1-C30 alkyl radical, or a C6-C20 substituted or unsubstituted aryl radical;

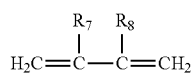 (E)

wherein R$_7$ is H or a C1-C18 alkyl radical, and R$_8$ is H, a C1-C18 alkyl radical, or Cl;

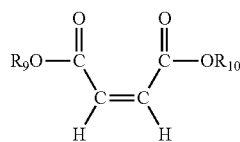 (F)

wherein R$_9$ and R$_{10}$ are independently H, a C1-C30 alkyl radical, a C6-C20 substituted or unsubstituted aryl radical, a C5-C30 substituted or unsubstituted cycloalkyl radical, or heterocyclic radicals;

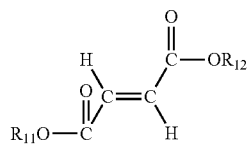 (G)

wherein R$_{11}$ and R$_{12}$ are independently H, a C1-C30 alkyl radical, a C6-C20 substituted or unsubstituted aryl radical, a C5-C30 substituted or unsubstituted cycloalkyl radical, or heterocyclic radicals;

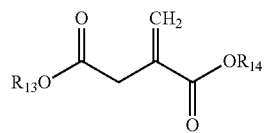 (H)

wherein R$_{13}$ and R$_{14}$ are independently H, a C1-C30 alkyl radical, a C6-C20 substituted or unsubstituted aryl radical, a C5-C30 substituted or unsubstituted cycloalkyl radical, or heterocyclic radicals;

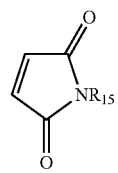 (I)

wherein R$_{15}$ is H, a C1-C30 alkyl radical, a C6-C20 substituted or unsubstituted aryl radical, a C5-C30 substituted or unsubstituted cycloalkyl radical, or heterocyclic radicals;

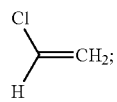 (J)

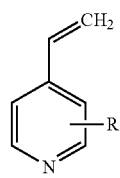 (K)

wherein R$_{16}$ is H, a C1-C30 alkyl radical, or a C6-C20 aryl radical;

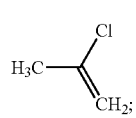 (L)

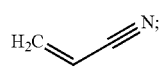 (M)

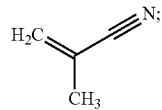 (N)

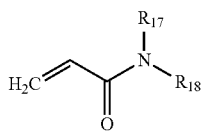
(O)

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals;

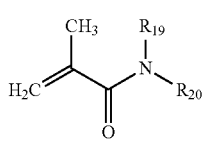
(P)

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

In one embodiment of the present invention, the drag reducing polymer can comprise repeating units of the residues of C4-C20 alkyl, C6-C20 substituted or unsubstituted aryl, or aryl-substituted C1-C10 alkyl ester derivatives of methacrylic acid or acrylic acid. In another embodiment, the drag reducing polymer can be a copolymer comprising repeating units of the residues of 2-ethylhexyl methacrylate and the residues of at least one other monomer. In yet another embodiment, the drag reducing polymer can be a copolymer comprising repeating units of the residues of 2-ethylhexyl methacrylate monomers and butyl acrylate monomers. In still another embodiment, the drag reducing polymer can be a homopolymer comprising repeating units of the residues of 2-ethylhexyl methacrylate.

In one embodiment of the present invention, the drag reducing polymer can comprise the residues of at least one monomer having a heteroatom. As stated above, the term "heteroatom" includes any atom that is not a carbon or hydrogen atom. Specific examples of heteroatoms include, but are not limited to, oxygen, nitrogen, sulfur, phosphorous, and/or chlorine atoms. In one embodiment, the drag reducing polymer can comprise at least about 10 percent, at least about 25 percent, or at least 50 percent of the residues of monomers having at least one heteroatom. Additionally, the heteroatom can have a partial charge. As used herein, the term "partial charge" is defined as an electric charge, either positive or negative, having a value of less than 1.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in *J. Soc. Cosmet. Chem.*, 1, 311 (1949) and *J. Soc. Cosmet. Chem.*, 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinic (available as HAMPO-SYL L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly(ethyleneoxy) ethanols (available as the IGEPAL CA and CO series, respectively from Rhodia, Cranbury, N.J.), C8 to C18 ethoxylated primary alcohols (such as RHODASURF LA-9 from Rhodia Inc., Cranbury, N.J.), C11 to C15 secondary-alcohol ethoxylates (available as the TERGITOL 15-S series, including 15-S-7, 15-S-9,15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

In one embodiment, the initiation system for use in the above-mentioned reaction mixture can be any suitable system for generating free radicals necessary to facilitate emulsion polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, erythorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. In another embodiment, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids, such as those listed below.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

Generally, the hydrate inhibitor can be any composition that when mixed with distilled water at a 1:1 weight ratio produces a hydrate inhibited liquid mixture having a gas hydrate formation temperature at 2,000 psia that is lower than the gas hydrate formation temperature of distilled water at 2,000 psia by an amount in the range of from about 10 to about 150° F., in the range of from about 20 to about 80° F., or in the range of from 30 to 60° F. For example, monoethylene glycol qualifies as a hydrate inhibitor because the gas hydrate formation temperature of distilled water at 2,000 psia is about 70° F., while the gas hydrate formation temperature of a 1:1 mixture of distilled water and monoethylene glycol at 2,000 psia is about 28° F. Thus, monoethylene glycol lowers the gas hydrate formation temperature of distilled water at 2,000 psia by about 42° F. when added to the distilled water at a 1:1 weight ratio. It should be noted that the gas hydrate formation temperature of a particular liquid may vary depending on the compositional make-up of the natural gas used to determine the gas hydrate formation temperature. Therefore, when gas hydrate formation temperature is used herein to define what constitutes a "hydrate inhibitor," such gas hydrate temperature is presumed to be determined using a natural gas composition containing 92 mole percent methane, 5 mole percent ethane, and 3 mole percent propane.

In forming the reaction mixture, the monomer, water, the at least one surfactant, and optionally the hydrate inhibitor, can be combined under a substantially oxygen-free atmosphere that is maintained at less than about 1,000 ppmw oxygen or less than about 100 ppmw oxygen. The oxygen-free atmosphere can be maintained by continuously purging the reaction vessel with an inert gas such as nitrogen and/or argon. The temperature of the system can be kept at a level from the freezing point of the continuous phase up to about 60° C., in the range of from about 0 to about 45° C., or in the range of from 0 to 30° C. The system pressure can be maintained in the range of from about 5 to about 100 psia, in the range of from about 10 to about 25 psia, or about atmospheric pressure. However, higher pressures up to about 300 psia can be necessary to polymerize certain monomers, such as diolefins.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

The following table sets forth approximate broad and narrow ranges for the amounts of the ingredients present in the reaction mixture.

| Ingredient | Broad Range | Narrow Range |
| --- | --- | --- |
| Monomer (wt. % of reaction mixture) | 10-60% | 30-50% |
| Water (wt. % of reaction mixture) | 20-80% | 50-70% |
| Surfactant (wt. % of reaction mixture) | 0.1-10% | 0.25-6% |
| Initiation system | | |
| Monomer:Initiator (molar ratio) | $1 \times 10^3\!:\!1\text{-}5 \times 10^6\!:\!1$ | $5 \times 10^3\!:\!1\text{-}2 \times 10^6\!:\!1$ |
| Monomer:Reducing Comp. (molar ratio) | $1 \times 10^3\!:\!1\text{-}5 \times 10^6\!:\!1$ | $1 \times 10^4\!:\!1\text{-}2 \times 10^6\!:\!1$ |
| Accelerator:Initiator (molar ratio) | 0.001:1-10:1 | 0.005:1-1:1 |
| Buffer | \multicolumn{2}{l}{0 to amount necessary to reach pH of initiation (initiator dependent, typically between about 6.5-10)} |
| Optional hydrate inhibitor | \multicolumn{2}{l}{If present, the hydrate inhibitor can have a hydrate inhibitor-to-water weight ratio from about 1:10 to about 10:1, about 1:5 to about 5:1, or 2:3 to 3:2.} |

The emulsion polymerization reaction yields a latex composition comprising a dispersed phase of solid particles and a liquid continuous phase. The latex can be a stable colloidal dispersion comprising a dispersed phase of high molecular weight polymer particles and a continuous phase comprising water. The colloidal particles can comprise in the range of from about 10 to about 60 percent by weight of the latex, or in the range of from 40 to 50 percent by weight of the latex. The continuous phase can comprise water, the high HLB surfactant, the hydrate inhibitor (if present), and buffer as needed. Water can be present in the range of from about 20 to about 80 percent by weight of the latex, or in the range of from about 40 to about 60 percent by weight of the latex. The high HLB surfactant can comprise in the range of from about 0.1 to about 10 percent by weight of the latex, or in the range of from 0.25 to 6 percent by weight of the latex. As noted in the table above, the buffer can be present in an amount necessary to reach the pH required for initiation of the polymerization reaction and is initiator dependent. Typically, the pH required to initiate a reaction is in the range of from 6.5 to 10.

When a hydrate inhibitor is employed in the reaction mixture, it can be present in the resulting latex in an amount that yields a hydrate inhibitor-to-water weight ratio in the range of from about 1:10 to about 10:1, in the range of from about 1:5 to about 5:1, or in the range of from 2:3 to 3:2. Alternatively, all or part of the hydrate inhibitor can be added to the latex after polymerization to provide the desired amount of hydrate inhibitor in the continuous phase of the latex.

In one embodiment of the present invention, the drag reducing polymer of the dispersed phase of the latex can have a weight average molecular weight ($M_w$) of at least about $1 \times 10^6$ g/mol, at least about $2 \times 10^6$ g/mol, or at least $5 \times 10^6$ g/mol. The colloidal particles of drag reducing polymer can have a mean particle size of less than about 10 microns, less than about 1,000 nm (1 micron), in the range of from about 10 to about 500 nm, or in the range of from 50 to 250 nm. At least about 95 percent by weight of the colloidal particles can be larger than about 10 nm and smaller than about 500 nm. At least about 95 percent by weight of the particles can be larger than about 25 nm and smaller than about 250 nm. The continuous phase can have a pH in the range of from about 4 to about 10, or in the range of from about 6 to about 8, and contains few if any multi-valent cations.

In one embodiment of the present invention, the drag reducing polymer can comprise at least about 10,000, at least about 25,000, or at least 50,000 repeating units selected from the residues of the above mentioned monomers. In one embodiment, the drag reducing polymer can comprise less than 1 branched unit per each monomer residue repeating unit. Additionally, the drag reducing polymer can comprise less than 1 linking group per each monomer residue repeating unit. Furthermore, the drag reducing polymer can exhibit little or no branching or crosslinking. Also, the drag reducing polymer can comprise perfluoroalkyl groups in an amount in the range of from about 0 to about 1 percent based on the total number of monomer residue repeating units in the drag reducing polymer.

As mentioned above, a liquid hydrocarbon can be treated with the drag reducing polymer in order to reduce drag associated with flowing the liquid hydrocarbon through a conduit. In order for the drag reducing polymer to function as a drag reducer, the polymer should dissolve or be substantially solvated in the liquid hydrocarbon. Accordingly, in one embodiment of the present invention, the drag reducing polymer can have a solubility parameter that is within about 20 percent, about 18 percent, about 15 percent, or 10 percent of the solubility parameter of the liquid hydrocarbon, as discussed above.

The solubility parameter of the drag reducing polymer is determined according to the Van Krevelen method of the Hansen solubility parameters. This method of determining solubility parameters can be found on pages 677 and 683-686 of Brandrup et al., *Polymer Handbook* (4$^{th}$ ed., vol. 2, Wiley-Interscience, 1999), which is incorporated herein by reference. According to Brandrup et al., the following general equation was developed by Hansen and Skaarup to account for dispersive forces, polar interactions, permanent dipole-dipole interactions, and hydrogen bonding forces in determining solubility parameters:

$$\delta = (\delta_d^2 + \delta_p^2 + \delta_h^2)^{1/2}$$

where $\delta$ is the solubility parameter, $\delta_d$ is the term adjusting for dispersive forces, $\delta_p$ is the term adjusting for polar interactions, and $\delta_h$ is the term adjusting for hydrogen bonding and permanent dipole-induced dipole. Systems have been developed to estimate the above terms using a group contribution method, measuring the contribution to the overall solubility parameter by the various groups comprising the polymer. The following equations are used in determining the solubility parameter of a polymer according to the Van Krevelen method:

$$\delta_p = (\Sigma F_{pi}^2)^{1/2}/V$$

$$\delta_h = (\Sigma E_{hi}/V)^{1/2}$$

$$\delta_d = \Sigma F_{di}/V$$

The above equations and an explanation of how they are used can be found on pages 677 and 683-686 of Brandrup et al. The values for the variables F and E in the above equations are given in table 4, page 686 of Brandrup et al., based on the different residues comprising a polymer. For example, a methyl group (—$CH_3$) is given the following values: $F_{di}$=420 ($J^{1/2}cm^{3/2}$/mol), $F_{pi}$=0 ($J^{1/2}cm^{3/2}$/mol), $E_{hi}$=0 J/mol. Additionally, the values for the variable V in the above equations are given in Table 3 on page 685 where, for example, a methyl group (—$CH_3$) is given a value of V=33.5 ($cm^3$/mol). Using these values, the solubility parameter of a polymer can be calculated.

In one embodiment of the present invention, the drag reducing polymer can have a solubility parameter, as determined according to the above equations, of at least about 17 $MPa^{1/2}$, in the range of from about 17.1 to about 24 $MPa^{1/2}$, or in the range of from 17.5 to 23 $MPa^{1/2}$. Furthermore, the drag reducing polymer can have a solubility parameter that is within about 4 $MPa^{1/2}$, within about 3 $MPa^{1/2}$, or within 2.5 $MPa^{1/2}$ of the solubility parameter of the liquid hydrocarbon.

The drag reducing polymer can be added to the liquid hydrocarbon in an amount sufficient to yield a drag reducing polymer concentration in the range of from about 0.1 to about 500 ppmw, in the range of from about 0.5 to about 200 ppmw, in the range of from about 1 to about 100 ppmw, or in the range of from 2 to 50 ppmw. In one embodiment, at least about 50 weight percent, at least about 75 weight percent, or at least 95 weight percent of the solid drag reducing polymer particles can be dissolved by the liquid hydrocarbon. In another embodiment, the viscosity of the liquid hydrocarbon treated with the drag reducing polymer is not less than the viscosity of the liquid hydrocarbon prior to treatment with the drag reducing polymer.

The efficacy of the high molecular weight polymer particles as drag reducers when added directly to a liquid hydrocarbon is largely dependent upon the temperature of the liquid hydrocarbon. For example, at lower temperatures, the polymer dissolves at a lower rate in the liquid hydrocarbon, therefore, less drag reduction can be achieved. Thus, in one embodiment of the present invention, the liquid hydrocarbon can have a temperature at the time of treatment with the drag reducing polymer of at least about 30° C., or at least 40° C.

The drag reducers employed in the present invention can provide significant percent drag reduction. For example, the drag reducers can provide at least about 5 percent drag reduction, at least about 15 percent drag reduction, or at least 20 percent drag reduction. Percent drag reduction and the manner in which it is calculated are more fully described in Example 5, below.

EXAMPLES

The following examples are intended to be illustrative of the present invention in order to teach one of ordinary skill in the art to make and use the invention and are not intended to limit the scope of the invention in any way.

Example 1

Preparation of Polymer A and Polymer B

In this example, two formulations for the materials used in later examples are detailed. The resulting material in each procedure is a dispersion of drag reducing polymer in an aqueous carrier.

Preparation of Polymer A

Polymerization was performed in a 185-gallon stainless steel, jacketed reactor with a mechanical stirrer, thermocouple, feed ports, and nitrogen inlets/outlets. The reactor was charged with 440 lbs of monomer (2-ethylhexyl methacrylate), 558.1 lbs of de-ionized water, 41.4 lbs of Polystep B-5 (surfactant, available from Stepan Company of Northfield, Ill.), 44 lbs of Tergitol 15-S-7 (surfactant, available from Dow Chemical Company of Midland, Mich.), 1.86 lbs of potassium phosphate monobasic (pH buffer), 1.46 lbs of potassium phosphate dibasic (pH buffer), and 33.2 grams of ammonium persulfate, $(NH_4)_2S_2O_8$ (oxidizer).

The mixture was agitated at 110 rpm to emulsify the monomer in the water and surfactant carrier. The mixture was then purged with nitrogen to remove any traces of oxygen in the reactor and cooled to about 41° F. The agitation was slowed down to 80 rpm and the polymerization reaction was initiated by adding into the reactor 4.02 grams of ammonium iron(II) sulfate, $Fe(NH_4)_2(SO_4)_2 \cdot 6H_2O$ in a solution of 0.010 M sulfuric acid solution in DI water at a concentration of 558.3 ppm at a rate of 10 g/min. The solution was injected for 10 hours to complete the polymerization. The resulting latex was pressured out of the reactor through a 5-micron bag filter and stored. The solubility parameter of Polymer A was calculated to be 18.04 $MPa^{1/2}$.

Preparation of Polymer B

Preparation of Polymer B was performed in the same manner as the preparation of Polymer A above, with the following exception: the monomer charged to the reactor was an 80/20 weight percent blend of 2-ethylhexyl methacrylate and n-butyl acrylate. The solubility parameter of Polymer B was calculated to be 20.55 $MPa^{1/2}$.

Example 2

LP 100 and LP 300

LP 100 FLOW IMPROVER (LP 100) and LP 300 FLOW IMPROVER (LP 300) underwent various tests described below and were compared to the experimental drag reducers of the present invention, Polymer A and Polymer B, as described in Example 1. LP 100 and LP 300 are drag reducing agents comprising polyalphaolefins. Specifically, LP 100 comprises poly(1-decene) and LP 300 comprises a copolymer of poly(1-decene) and poly(1-tetradecene). Both LP 100 and LP 300 are commercially available from ConocoPhillips Specialty Products Inc. The solubility parameter of the polymer in LP 100 was calculated to be 16.49 $MPa^{1/2}$, and the solubility parameter of the polymer in LP 300 was calculated to be 16.54 $MPa^{1/2}$.

Example 3

Asphaltene Content and Elasticity Response (Affinity)

Crude oils ranging in classification from heavy crudes to light crudes were first tested to determine their respective concentrations of asphaltene and their API gravities. These same crude oil samples were also tested to determine their affinity for drag reducing agents as prepared in Examples 1 and 2. The results are listed in Table 1 below.

Asphaltene concentration was determined using pentane precipitation and filtration. For each measurement listed in Table 1, a 40-fold volume of pentane was added to approximately 16 grams of crude oil sample. The mixtures were agitated via rolling for an overnight period, and allowed to set for approximately 24 hours. The mixtures were then filtered through a 0.8 micrometer filter to retain the asphaltene. The asphaltenes retained were then weighed, and the weight percent was calculated based upon the original crude oil sample weight. API gravity was determined in accord with ASTM test method D1298.

The crude oil's affinity for drag reducing agents was determined by assessing each crude oil's elasticity after being treated with a drag reducing agent. Four samples of each variety of crude oil were dosed at room temperature with 5 weight percent of Polymer A, Polymer B, LP 100, and LP 300 respectively. The samples were allowed to roll overnight to insure full dissolution of the drag reducing agent into the samples. After rolling, the samples were visually inspected for their elastic response by inserting a hooked-end spatula into the sample and pulling the spatula away from the bulk of the sample. Some samples yielded a high response, meaning that a highly elastic "string" or "rope" of crude oil could be pulled from the sample. Conversely, some samples yielded no response, meaning that the crude oil merely dripped from the spatula.

TABLE 1

Asphaltene Content, API Gravity, and Elasticity Response

| Crude Oil Sample | Type | ASPHALTENE CONTENT | | API Gravity | ELASTICITY RESPONSE (AFFINITY) | | | |
|---|---|---|---|---|---|---|---|---|
| | | Test 1 | Test 2 | | LP 100 | LP 300 | Polymer A | Polymer B |
| Merey | Heavy | 16.8 | 15.5 | 16.0° | None | None | High | High |
| Petrozuata | Heavy | 18.8 | 18.1 | 9.1° | None | None | High | High |
| Corocoro | Heavy | 6.0 | 6.7 | 25.1° | None | None | High | High |
| Albian | Heavy | 11.0 | 10.6 | 22.4° | None | None | High | High |
| Bow River | Heavy | 11.4 | 10.3 | 21.8° | None | None | High | High |
| Maya | Heavy | 14.6 | 15.4 | 21.9° | None | None | High | High |
| Western Canadian Select | Heavy | 11.5 | 11.9 | 20.9° | None | None | High | High |
| San Joaquin Valley | Heavy | 8.9 | 8.9 | 13.0° | None | None | High | High |
| Marlim Blend | Heavy | 6.7 | 6.6 | 22.2° | High | High | High | High |
| West Texas Sour | Intermediate | 2.8 | 2.8 | 31.6° | High | High | Moderate | Moderate |
| West Texas Intermediate | Light | 0.5 | — | 41.6° | High | High | Moderate | Moderate |
| Basrah | Light | 4.8 | — | 31.0° | High | High | Moderate | Moderate |

The results in Table 1 tend to show that crude oils having a higher asphaltene content and/or lower API gravity have a higher affinity for Polymers A and B than for LP 100 and 300. Evidence of stronger affinity (i.e., increased elasticity) is generally an indication of a higher potential for performance as a drag reducing agent.

Example 4

Extensional Rheometry

The extensional viscosity (or extensional behavior) of a fluid treated with a drag reducing polymer is directly related to the polymer's potential for reducing turbulent drag in the fluid. If increased extensional behavior is observed in the fluid upon addition of the drag reducing polymer, this is indicative of increased potential for drag reduction performance. Conversely, if no extensional behavior is observed, the potential for drag reduction performance in that fluid is unlikely. The extensional behavior of a treated fluid can be determined by capillary breakup extensional rheometry testing, performed on a HAAKE CaBER 1, available from Thermo Electron Corp., Newington, N.H., U.S.A.

The HAAKE CaBER 1 is operated by placing a small quantity of sample (less than 0.1 ml) between top and bottom circular plates using a 16 gauge, 1-inch long syringe needle. The top plate is rapidly separated upwardly from the bottom plate at a user-selected strain rate, thereby forming an unstable fluid filament by imposing an instantaneous level of extensional strain on the fluid sample. After cessation of stretching, the fluid at the mid-point of the filament undergoes an extensional strain rate defined by the extensional properties of the fluid. A laser micrometer monitors the midpoint diameter of the gradually thinning fluid filament as a function of time. The competing effects of surface tension, viscosity, mass transfer and elasticity can be quantified using model fitting analysis software.

In this example, three samples were prepared and tested for extensional rheometry using a HAAKE CaBER 1. The first sample was untreated (neat) San Juaquin Valley Heavy (SJVH) crude oil. The second sample was SJVH crude containing 500 ppmw of the active polymer found in Polymer A (poly(2-ethylhexyl methacrylate)) as prepared in Example 1, and the third sample was SJVH crude containing 500 ppmw of the active polymer found in LP 100 (poly(1-decene)) as described in example 2. According to the procedure described above, less than 0.1 ml of each of these three samples was placed between the two plates of the CaBER 1, and the plates were separated quickly while measuring the diameter of the resultant filament. For each test, the default instrument settings were employed, and a Hencky strain of $\epsilon=0.70$ was used. Hencky strain is defined as:

$$\varepsilon = \ln\left(\frac{L}{L_0}\right)$$

where $\frac{L}{L_0}$ is the relative extension of the fluid. The diameter of the resultant filament was measured against time. Each sample in the above described procedure was tested 10 times to obtain statistical confidence in the data. The results from these tests are shown in FIGS. 1 through 3. Additionally, each test was performed at a room temperature of about 25° C.

In each of FIGS. 1, 2, and 3, the filament diameter was normalized, such that a filament diameter of $d/d_0$ is shown, where $d_0$ is the filament diameter at time zero (0 seconds) and d is the filament diameter at any given time thereafter. The results from these tests show that the extensional behavior of the untreated SJVH crude oil and SJVH crude oil containing 500 ppmw the active polymer found in LP 100 (poly(1-decene)) are very similar (shown in FIGS. 1 and 3, respectively), indicating that LP 100 does not have any noticeable potential for reducing drag of heavy crude oil in a pipeline. However, SJVH having 500 ppmw of the active polymer found in Polymer A (poly(2-ethylhexyl methacrylate)) shows a significant increase in extensional rheometry, as shown in FIG. 2. This increase in extensional rheometry indicates an increased potential for Polymer A to reduce drag of heavy crude oil in a pipeline.

Example 5

Pipeline Testing

Pipeline field testing was performed with various diameter pipelines, and various crude oils, comparing the performance of Polymers A and B, as prepared in Example 1, with LP 100 and LP 300, as described in Example 2. The following three tests were performed, followed by their respective results in tables 2, 3, and 4. For each of the three tests described below, the percent drag reduction (% DR) was determined by measuring the pressure drop in the segment of pipe being tested prior to addition of drag reducing agent ($\Delta P_{base}$) and measuring the pressure drop in the segment of pipe being tested after addition of drag reducing agent ($\Delta P_{treated}$). The percent drag reduction was then determined according to the following formula:

% DR=$((\Delta P_{base}-\Delta P_{treated})/\Delta P_{base})\times 100\%$

Test 1

Test 1 was conducted in a 12-inch diameter crude oil pipeline carrying West Texas Intermediate (WTI) crude oil. This crude oil is a light crude, generally having an API gravity of about 40°. WTI generally has a viscosity of approximately 4.5 centistokes at pipeline temperatures of 65 to 69° F. The pipeline tests in Test 1 were conducted in a 62-mile segment of the pipeline running from Wichita Falls, Tex., to Bray, Okla. The nominal flow rate of the pipeline during the field tests was 2,350 barrels/hr, and the nominal flow velocity in the pipeline was 4.5 ft/s. The following drag reduction performance was achieved:

TABLE 2

LP 100 v. Polymer A & Polymer B in Light Crude (WTI)

| PRODUCT | CONCENTRATION (ppmw) | DRAG REDUCTION (%) |
|---|---|---|
| LP 100 | 4.7 | 33.8 |
| LP 100 | 23.5 | 67.2 |
| Polymer A | 40.4 | 24.4 |
| Polymer A | 80.1 | 36.3 |
| Polymer B | 40.2 | 31.3 |
| Polymer B | 81.0 | 40.4 |
| Polymer B | 150.4 | 45.7 |

Test 2

Test 2 was conducted in an 18-inch diameter crude oil pipeline carrying Albian Heavy Sour (AHS) crude oil blend. This crude oil blend is a heavy crude oil, generally having an API gravity of about 22°. AHS generally has a viscosity of approximately 84 centistokes at a pipeline temperature of 71° F. The pipeline tests in Test 2 were conducted in a 54-mile segment of the pipeline running from Cushing, Okla., to Marland, Okla. The nominal flow velocity in the pipeline was 4.8 ft/s. The nominal calculated Reynolds number for the pipeline was 7,500. The following drag reduction performance was achieved:

TABLE 3

LP 100 v. Polymer B in Heavy Crude (AHS)

| PRODUCT | CONCENTRATION (ppmw) | DRAG REDUCTION (%) |
|---|---|---|
| LP 100 | 41.6 | 0 |
| Polymer B | 25.2 | 23.1 |
| Polymer B | 100.0 | 42.5 |

Test 3

Test 3 was conducted in an 8-inch diameter crude oil pipeline carrying San Joaquin Valley Heavy (SJVH) crude oil blend. This crude oil blend is a heavy crude oil, generally having an API gravity of about 13°. SJVH generally has a viscosity of approximately 100 centistokes at a pipeline temperature of 165° F. The pipeline tests in Test 3 were conducted in a 14-mile segment of the pipeline running from the Middlewater pump station to the Junction pump station, both in California. The nominal flow rate of the pipeline during Test 3 was 1,300 barrels/hr, and the nominal flow velocity in the pipeline was 5.6 ft/s. The nominal calculated Reynolds number for the pipeline was 4,000. The following drag reduction performance was achieved:

TABLE 4

LP 300 v. Polymer A & Polymer B in Heavy Crude (SJVH)

| PRODUCT | CONCENTRATION (ppmw) | DRAG REDUCTION (%) |
|---|---|---|
| LP 300 | 187.0 | 0 |
| Polymer A | 50.0 | 28.5 |
| Polymer A | 100.0 | 39.5 |
| Polymer B | 50.0 | 28.8 |
| Polymer B | 100 | 36.7 |

Comparing the above three tests, the results listed in Table 2 tend to show that the drag reduction achieved by addition of LP 100 product in light crude oil yields slightly more favorable results than either of the EXP products. However, when heavy crude oils are used, as shown in Tables 3 and 4, the use of Polymers A or B results in higher percentages of drag reduction than either of the LP products.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

DEFINITIONS

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A method comprising:

introducing a drag reducing polymer, into a pipeline, such that the friction loss associated with the turbulent flow through the pipeline is reduced by suppressing the growth of turbulent eddies, into a liquid hydrocarbon having an asphaltene content of at least 3 weight percent and/or an API gravity of less than about 26° to thereby produce a treated liquid hydrocarbon wherein the viscosity of the treated liquid hydrocarbon is not less than the viscosity of the liquid hydrocarbon prior to treatment with the drag reducing polymer; and wherein a plurality of the repeating units comprise a heteroatom.

2. The method of claim 1, wherein the drag reducing polymer comprises at least about 25,000 repeating units.

3. A method comprising:

introducing a drag reducing polymer, into a pipeline, such that the friction loss associated with the turbulent flow through the pipeline is reduced by suppressing the growth of turbulent eddies, into a liquid hydrocarbon having an asphaltene content of at least 3 weight percent and an API gravity of less than about 26° to thereby produce a treated liquid hydrocarbon wherein the viscosity of the treated liquid hydrocarbon is not less than the viscosity of the liquid hydrocarbon prior to treatment with the drag reducing polymer;

wherein a plurality of the repeating units comprise a heteroatom and the heteroatom is selected from the group consisting of an oxygen atom, a nitrogen atom, a sulfur atom and/or a phosphorus atom.

4. The method of claim 1, wherein the drag reducing polymer has a weight average molecular weight of at least $1 \times 10^6$ g/mol.

5. A method comprising:

introducing a drag reducing polymer such that the friction loss associated with the turbulent flow through the pipeline is reduced by suppressing the growth of turbulent eddies, into a liquid hydrocarbon having an asphaltene content of at least 3 weight percent and/or an API gravity of less than about 26° to thereby produce a treated liquid hydrocarbon wherein the viscosity of the treated liquid hydrocarbon is not less than the viscosity of the liquid hydrocarbon prior to treatment with the drag reducing polymer;

wherein the drag reducing polymer comprises at least about 25,000 repeating units, and wherein a plurality of the repeating units comprise a heteroatom, wherein the heteroatom is selected from the group consisting of an oxygen atom, a nitrogen atom, a sulfur atom and/or a phosphorus atom and wherein the drag reducing polymer has a weight average molecular weight of at least $1 \times 10^6$ g/mol.

* * * * *